US012147791B1

(12) United States Patent
Bui et al.

(10) Patent No.: US 12,147,791 B1
(45) Date of Patent: Nov. 19, 2024

(54) NEURAL NETWORK SYSTEMS FOR SOURCE CODE SUMMARIZATION

(71) Applicant: FPT USA Corp., Richardson, TX (US)

(72) Inventors: Quoc Nghi Duy Bui, Ho Chi Minh (VN); Minh Huynh Nguyen, Phu Yen (VN); Phong Xuan Nguyen, Ha Noi (VN)

(73) Assignee: FPT USA Corp., Richardson, TX (US)

( * ) Notice: Subject to any disclaimer, the term of this patent is extended or adjusted under 35 U.S.C. 154(b) by 0 days.

(21) Appl. No.: 18/592,810

(22) Filed: Mar. 1, 2024

(51) Int. Cl.
 *G06F 8/40* (2018.01)
(52) U.S. Cl.
 CPC ..................................... *G06F 8/40* (2013.01)
(58) Field of Classification Search
 CPC . G06F 16/345; G06F 8/73; G06F 8/75; G06F 8/40; G06F 8/425; G06F 8/443; G06F 40/284
 See application file for complete search history.

(56) References Cited

U.S. PATENT DOCUMENTS

2024/0134640 A1* 4/2024 Han ........................ G06F 8/73
2024/0273270 A1* 8/2024 Vasudevan .............. G06F 30/33

FOREIGN PATENT DOCUMENTS

CN     108519890 B    9/2018
KR     10260431    *  11/2021

OTHER PUBLICATIONS

Wenhan Wang et al.,"Learning Program Representations with a Tree-Structured Transformer," arXiv, 2023, retrieved online Aug. 27, 2024, pp. 1-12. Retrieved from the Internet: <UR: https://arxiv.org/pdf/2208.08643> (Year: 2023).*

* cited by examiner

*Primary Examiner* — Hanh Thi-Minh Bui

(57) ABSTRACT

A neural network system for summarizing source code is described. The neural network system includes one or more computers and one or more non-transitory computer storage media storing instructions that, when executed by the one or more computers, cause the one or more computers to implement: a heterogeneous code representation (HCR) generator; a sub-system; a Transformer encoder neural network; a tree-based encoder neural network; a heterogeneous graph transformer (HGT) neural network; and a graph aggregator. In some implementations, the neural network system includes one or more of a token index selector, a hierarchy-aware cross attention neural network layer, a gating neural network layer, and a Transformer decoder neural network.

20 Claims, 6 Drawing Sheets

| | |
|---|---|
| method_declaration | : method_header '(' statement* ')' |
| statement | : simple_statement \| compound_statement |
| *simple_statement* | : variable_declaration \| return_statement \| method_invocation \| assignment_statement \| break_statement \| continue_statement \| throw_statement \| expression_statement |
| compound_statement | : if_statement \| while_statement \| for_statement \| dowhile_statement \| switchcase_statement \| try_statement \| try_with_resources_statement |
| if_statement | : 'if' '(' expression ')' '' statement* '' ('else' 'if' '(' expression ')' '' statement* '')? ('else' '' statement* '')? |
| while_statement | : 'while' '(' expression ')' '' statement* '' |
| for_statement | : 'for' '(' variable_declaration? ';' expression? ';' expression? ')' '' statement* '' |
| dowhile_statement | : 'do' '' statement* '' 'while' '(' expression ')' |
| switchcase_statement | : 'switch' '(' expression ')' '' ('case' expression ':' '' statement* '')* '' |
| catch_clause | : 'catch' '(' identifier identifier ')' '' statement* '' |
| finally_clause | : 'finally' '' statement* '' |
| try_statement | : 'try' '' statement* '' catch_clause* finally_clause? |
| try_with_resources_statement | : 'try' '(' resource_specification ')' '' statement* '' catch_clause* finally_clause? |
| expression | : ternary_expression \| assignment_expression \| instanceof_expression \| cast_expression \| binary_expression \| unary_expression \| resource_specification \| update_expression \| primary_expression |
| primary_expression | : literal \| this \| identifier \| field_access \| array_access |
| INPUT | : method_declaration |
| OUTPUT | : method_header \| simple_statement \| expression |

FIG. 3

Heterogeneous Code Representation

Abstract Syntax Tree

US 12,147,791 B1

NEURAL NETWORK SYSTEMS FOR SOURCE CODE SUMMARIZATION

BACKGROUND

This disclosure generally relates to the field of code summarization, specifically to neural network systems for source code summarization.

Code summarization is a critical task in software development, aiming to condense the complexity of source code into concise and human-readable summaries. For software developers, this task serves as a valuable aid in understanding, maintaining, and collaborating on large codebases. With a code summary, developers can quickly grasp the functionality, inputs, and expected outputs of code segments without delving into the intricacies of the code itself. However, manual summarization and documentation of code can be a time-consuming and labor-intensive task for developers.

SUMMARY

In general, one innovative aspect of the subject matter described in this specification can be embodied in neural network system for summarizing source code. The neural network system includes one or more computers and one or more non-transitory computer storage media storing instructions that, when executed by the one or more computers, cause the one or more computers to implement:
  a heterogeneous code representation (HCR) generator configured to receive source code and to process the source code to generate a HCR of the source code, wherein the HCR comprises (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code;
  a sub-system configured to generate, for each node of the plurality of nodes in the AST sequence, a respective initial embedding for the node;
  a Transformer encoder neural network configured to receive the initial embeddings generated for the plurality of nodes, and to generate, for each initial embedding of each node, a respective learned representation that captures lexical information of the node;
  a tree-based encoder neural network configured to:
    receive as input the plurality of subtrees and the learned representations generated by the Transformer encoder neural network, and
    process the plurality of subtrees and the learned representations to generate, for each subtree, a respective tree embedding;
  a heterogeneous graph transformer (HGT) neural network configured to:
    receive as input the graph and the tree embeddings generated by the tree-based encoder neural network, and
    process the graph and the tree embeddings to generate a plurality of node vectors that represent dependencies between the plurality of nodes in the graph; and
  a graph aggregator configured to aggregate the plurality of node vectors to generate a graph embedding that encapsulates semantic information of the source code.

In some implementations, the neural network system includes a token index selector configured to receive the learned representations generated by the Transformer encoder neural network and to select a subset of learned representations that are associated with nodes having non-empty tokens.

In some implementations, the neural network system includes a hierarchy-aware cross attention neural network layer configured to: receive as input the learned representations, the tree embeddings generated by the tree-based encoder neural network, the plurality of node vectors, and the graph embedding, and process the learned representations, the tree embeddings, the plurality of node vectors, and the graph embedding to generate a fused hierarchical context output.

In some implementations, the neural network system includes a gating neural network layer configured to receive as input the subset of learned representation and the fused hierarchical context output, and to process the token index selection output and the fused hierarchical context output to generate hierarchy-aware hidden states.

In some implementations, the neural network system includes a Transformer decoder neural network configured to: receive as decoder input the hierarchy-aware hidden states, the graph embedding, and the plurality of node vectors; and process the decoder input to generate a system output.

In some implementations, the system output includes, for each position of a plurality of positions in a target text sequence, a probability distribution over target vocabulary for the position. In these implementations, the Transformer decoder neural network is configured to compute the probability distribution over the target vocabulary for each position based on (i) one or more probability distributions computed for one or more previous positions and (ii) the decoder input. The target text sequence is a summary of the source code.

The target vocabulary comprises a set of candidate tokens, in which the probability distribution over the target vocabulary for each position assigns a respective score to each candidate token in the set of candidate tokens. The respective score represents a likelihood the candidate token is the correct token that should be placed at the position in the target text sequence.

Another innovative aspect of the subject matter described in this specification can be embodied in a computer-implemented method for summarizing source code using a neural network system. The neural network includes a heterogeneous code representation (HCR) generator, a sub-system, a Transformer encoder neural network, a tree-based encoder neural network, a heterogeneous graph transformer (HGT) neural network, and a graph aggregator. The method includes:
  receiving, using the heterogeneous code representation (HCR) generator, source code;
  processing, using the heterogeneous code representation (HCR) generator, the source code to generate a HCR of the source code, in which the HCR comprises (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code;

generating, using the sub-system, for each node of the plurality of nodes in the AST sequence, a respective initial embedding for the node;

generating, using the Transformer encoder neural network, for each initial embedding generated for each of the plurality of nodes, a respective learned representation that captures lexical information of the node;

processing, using the tree-based encoder neural network, the plurality of subtrees and the learned representations to generate, for each subtree, a respective tree embedding;

processing, using the heterogeneous graph transformer (HGT) neural network, the graph and the tree embeddings to generate a plurality of node vectors that represent dependencies between the plurality of nodes in the graph; and aggregating, using the graph aggregator, the plurality of node vectors to generate a graph embedding that encapsulates semantic information of the source code.

In some implementations, the neural network system includes a token index selector. The method includes selecting, using the token index selector, from the learned representations, a subset of learned representations that are associated with nodes having non-empty tokens.

In some implementations, the neural network system includes a hierarchy-aware cross attention neural network layer. The method includes processing, using the hierarchy-aware cross attention neural network layer, the learned representations, the tree embeddings, the plurality of node vectors, and the graph embedding to generate a fused hierarchical context output.

In some implementations, the neural network system includes a gating neural network layer. The method includes processing, using the gating neural network layer, the token index selection output and the fused hierarchical context output to generate hierarchy-aware hidden states.

In some implementations, the neural network system includes a Transformer decoder neural network. The method includes processing, using the Transformer decoder neural network, a decoder input comprising the hierarchy-aware hidden states, the graph embedding, and the plurality of node vectors to generate a system output.

In some implementations, the system output includes, for each position of a plurality of positions in a target text sequence, a probability distribution over target vocabulary for the position. The target text sequence is a summary of the source code. In those implementations, the method includes computing, using the Transformer decoder neural network, the probability distribution over the target vocabulary for each position based on (i) one or more probability distributions computed for one or more previous positions and (ii) the decoder input. The target vocabulary includes a set of candidate tokens. The probability distribution over the target vocabulary for each position assigns a respective score to each candidate token in the set of candidate tokens, in which the respective score represents a likelihood the candidate token is the correct token that should be placed at the position in the target text sequence.

Other innovative aspects of the subject matter described in this specification can be embodied in one or more non-transitory storage media encoded with instructions that when implemented by one or more computers cause the one or more computers to implement the system and method described above.

The subject matter described in this specification can be implemented in particular embodiments so as to realize one or more of the following technical advantages.

Code summarization is an important task for software developers as it helps them understand and maintain source code effectively. However, manual summarization and documentation of code can be a time-consuming and labor-intensive task for developers. The techniques described in this specification allow for automated generation of code summaries of source code by using a neural network system that includes a heterogeneous code representation (HCR) generator, a sub-system, a Transformer encoder neural network, a tree-based encoder neural network, a heterogeneous graph transformer (HGT) neural network, a graph aggregator, and optionally, one or more of a token index selector, a hierarchy-aware cross attention neural network layer, a gating neural network layer, or a Transformer decoder neural network. Systems that implement the described neural network system can generate more accurate summaries than those generated by existing systems, because the described neural network system can understand essential features in source code, including lexical, syntax, and semantics information. A crucial part of semantic information is the relations among program elements including their data and control dependencies. The described neural network system can represent well such information in order to perform well in downstream tasks including code summarization.

More specifically, existing methods fail to generate accurate code summaries as they do not take into account the complex dependencies of program elements in syntax or semantics of the source code and they do not consider the code hierarchy. To address the drawbacks of existing methods, the techniques described in this specification generates a Heterogeneous Code Representation (HCR) of source code that can capture the essential code attributes at lexical, syntactic, and semantic levels in a code hierarchy that represents program elements based on their characteristics: sequences for code tokens, AST subtrees for syntax, and graphs for dependencies. Importantly, the described techniques can effectively capture program dependencies (dependencies between elements in the source code) by selectively abstracting coarse-grained nodes into a higher-level layer and fine-grained nodes into a lower-level layer. This technique contributes to generating more accurate summaries because the described neural network system has a deeper and more comprehensive understanding of the source code. To process HCR representations, the described neural network system includes a heterogeneous architecture, called HierarchyNet, which includes a Transformer encoder neural network for processing lexical information of the source code, a tree-based encoder neural network for processing syntactic information, and a graph-based encoder (i.e., a heterogeneous graph transformer (HGT) neural network) for capturing program dependencies between nodes that represent elements of the source code, and a graph aggregator that generates a graph embedding that encapsulates semantic information of the source code. These layers do not process information individually but hierarchically, which intuitively captures the relationships between elements even better. In addition, the described neural network system can include a hierarchy-aware cross attention neural network layer and a gating neural network layer to combine lexical, syntax, and semantics information of the source code across layers effectively.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates example rules for splitting an abstract syntax tree (AST) into subtrees.

Like reference numbers and designations in the various drawings indicate like elements.

DETAILED DESCRIPTION

Figure 1:
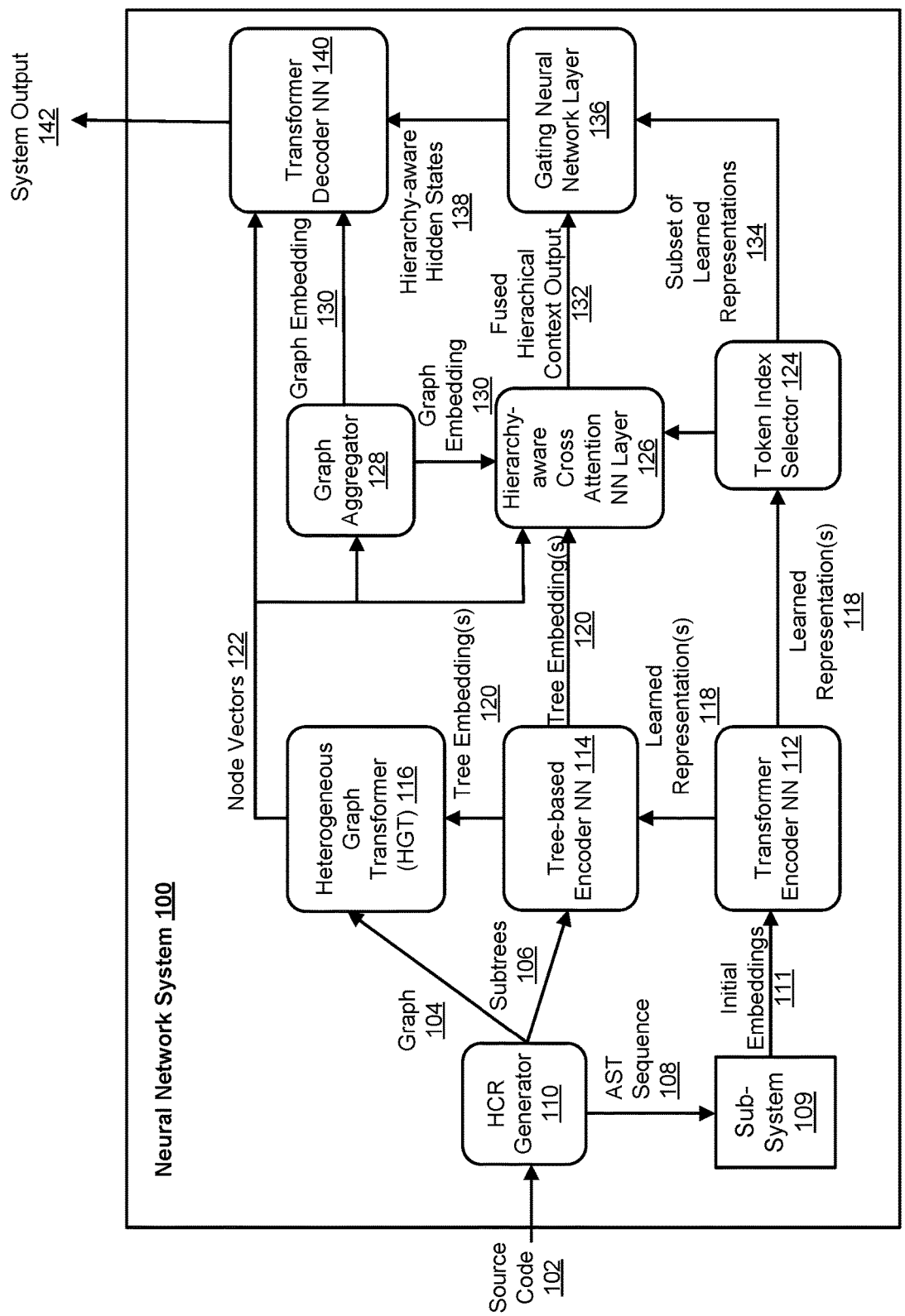
FIG. 1 shows an example neural network system for summarizing source code.

This specification describes a neural network system implemented as computer programs on one or more computers in one or more locations that is configured to automatically summarizing source code.

Source code is a set of human-readable instructions or statements written in a programming language that a software developer creates to instruct a computer or software system on how to perform a specific task or function. These instructions are written using tokens, symbols, and structures that programmers can comprehend and work with to create software applications.

Source code serves as the original, high-level representation of a computer program. Source code must be translated into machine-readable instructions through a process called compilation or interpretation, depending on the programming language. Once translated, the resulting machine code can be executed by a computer's CPU.

Source code is essential for software development, debugging, maintenance, and collaboration among developers, as it provides a structured and understandable representation of the logic and behavior of a software application or system.

A source code summary is a concise and human-readable description or overview of a piece of source code, such as a function, method, class, or module, that captures its main purpose, functionality, and key characteristics. Source code summaries allow developers to quickly grasp the functionality, inputs, and expected outputs of code segments without having to read and analyze the entire codebase.

Source code summaries are often used for documentation, code review, and collaboration among developers. They can help in the following ways:

Code Documentation: Summaries serve as a form of documentation, making it easier for developers to understand how to use or interact with a particular part of the codebase.

Code Review: During code review processes, summaries can help reviewers quickly assess the correctness and appropriateness of the code without delving into its implementation details.

Code Search: Summaries can be valuable when searching for specific functionalities within a large codebase, allowing developers to identify relevant code segments more efficiently.

Onboarding and Learning: For new team members or individuals working on unfamiliar code, summaries provide a quick introduction to the code's purpose and behavior.

Below is a simple Python function as example source code along with a corresponding summary of the source code. The source code includes a docstring used to document the function and provide information about its purpose, parameters, and return values.

Source Code:

```
def calculate_square (x):
    """
    This function calculates the square of a number.
    Args:
        x (float): The number to be squared.
    Returns:
        float: The square of the input number.
    """
    result=x**2
    return result
```

Summary:

The calculate_square function computes the square of a given number. It takes a single input parameter, x, which is expected to be a floating-point number. The function then returns the square of x as a floating-point result.

Figure 2:
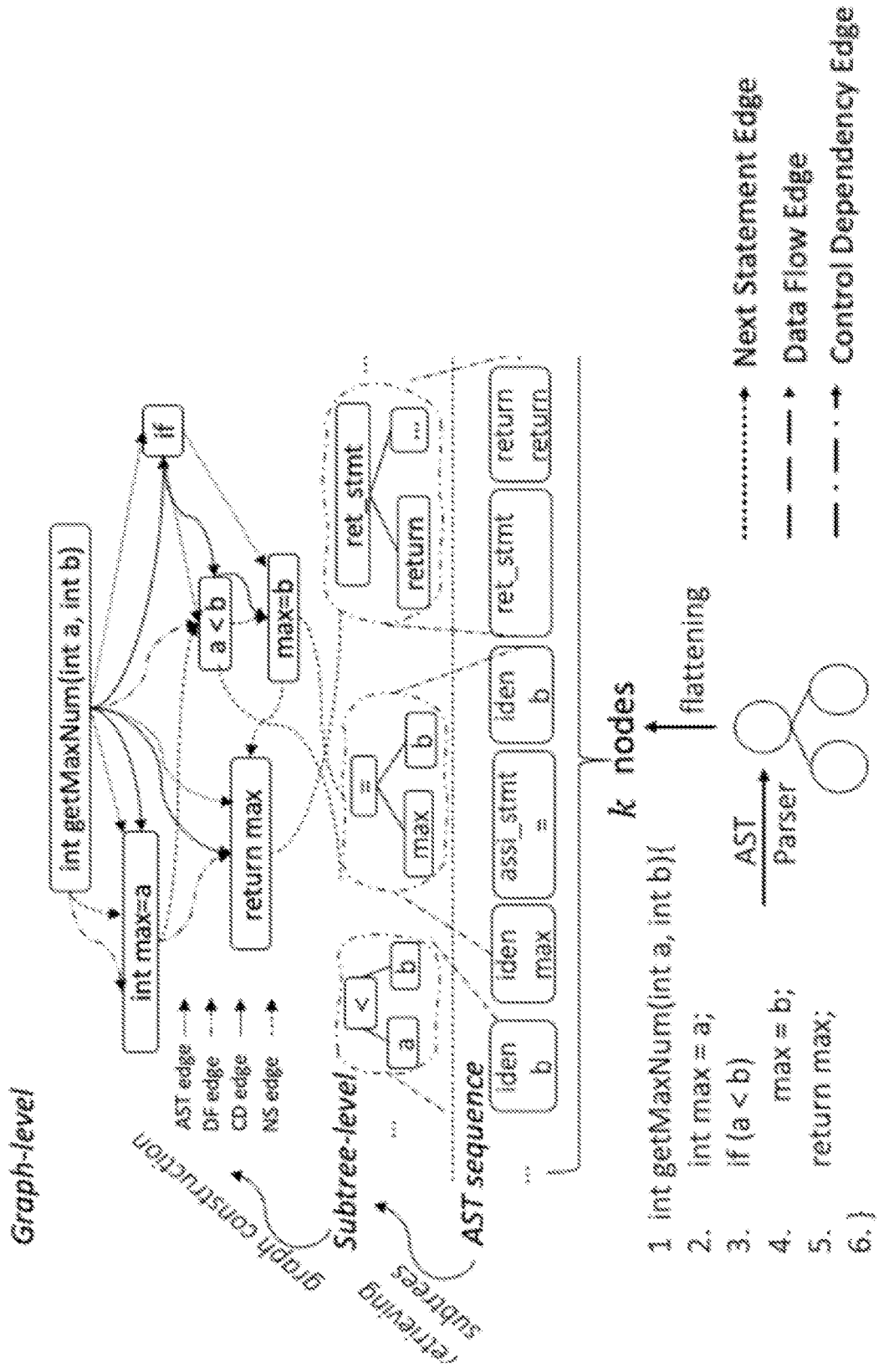
FIG. 2 illustrates an example HCR of example source code.
Figure 4:
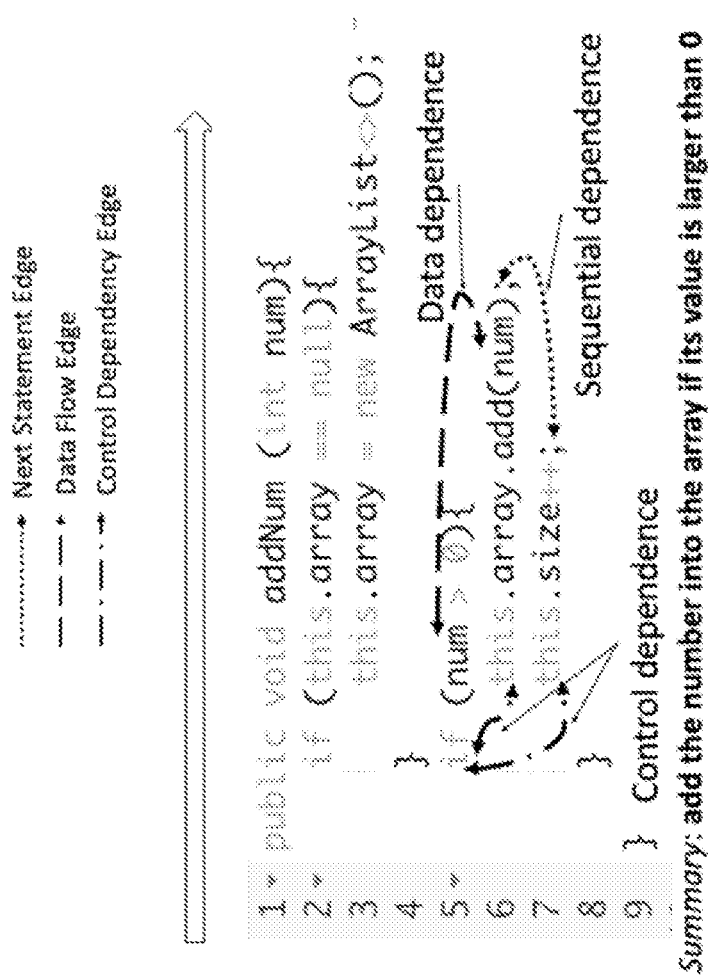
FIG. 4 shows an example source code.

Other examples of source code are shown in the bottom left of FIG. 2 and in FIG. 4.

FIG. 1 shows an example neural network system 100 for summarizing source code. The system 100 is an example of a system implemented as computer programs on one or more computers in one or more locations, in which the systems, components, and techniques described below can be implemented. The neural network system 100 includes a HCR generator 110, a sub-system 109, a Transformer encoder neural network 112, a tree-based encoder neural network 114, a heterogeneous graph Transformer (HGT) neural network 116, a token index selector 124, a hierarchy-aware cross attention neural network layer 126, a graph aggregator 128, a gating neural network layer 136, and a Transformer decoder neural network 140.

Each of the HCR generator 110, the token index selector 124, and the graph aggregator 128 is implemented as one or more software modules or components, installed on one or more computers in one or more locations. The sub-system 109 is a software-based system, subsystem, or process that is programmed to perform one or more specific functions. Generally, the sub-system 109 is implemented as one or more software modules or components, installed on one or more computers in one or more locations.

The neural network system 100 receives source code 102 as input. The HCR generator 110 is configured to process the source code 102 to generate a HCR (not shown in FIG. 1) of the source code 102.

The HCR includes an abstract syntax tree (AST) sequence 108 that includes a plurality of nodes L that are linearly arranged into a sequence. Each node represents one of a plurality of elements in the source code 102. Each node typically corresponds to a specific construct in the code, such as a variable declaration, function call, or arithmetic operation. Each node, denoted as $l_i \in L$, has two attributes: token and type.

The HCR also includes a plurality of subtrees 106 that represent syntax information of the source code 102. Syntax information refers to the arrangement and structure of code elements to create valid statements and expressions. It defines the rules for how tokens can be combined to form meaningful code constructs. For example, in C++ syntax, the following is a declaration of an integer variable:

int my_variable=10;

The syntax here specifies that an int variable is being declared and initialized with the value 10.

Figures 5A, 5B:
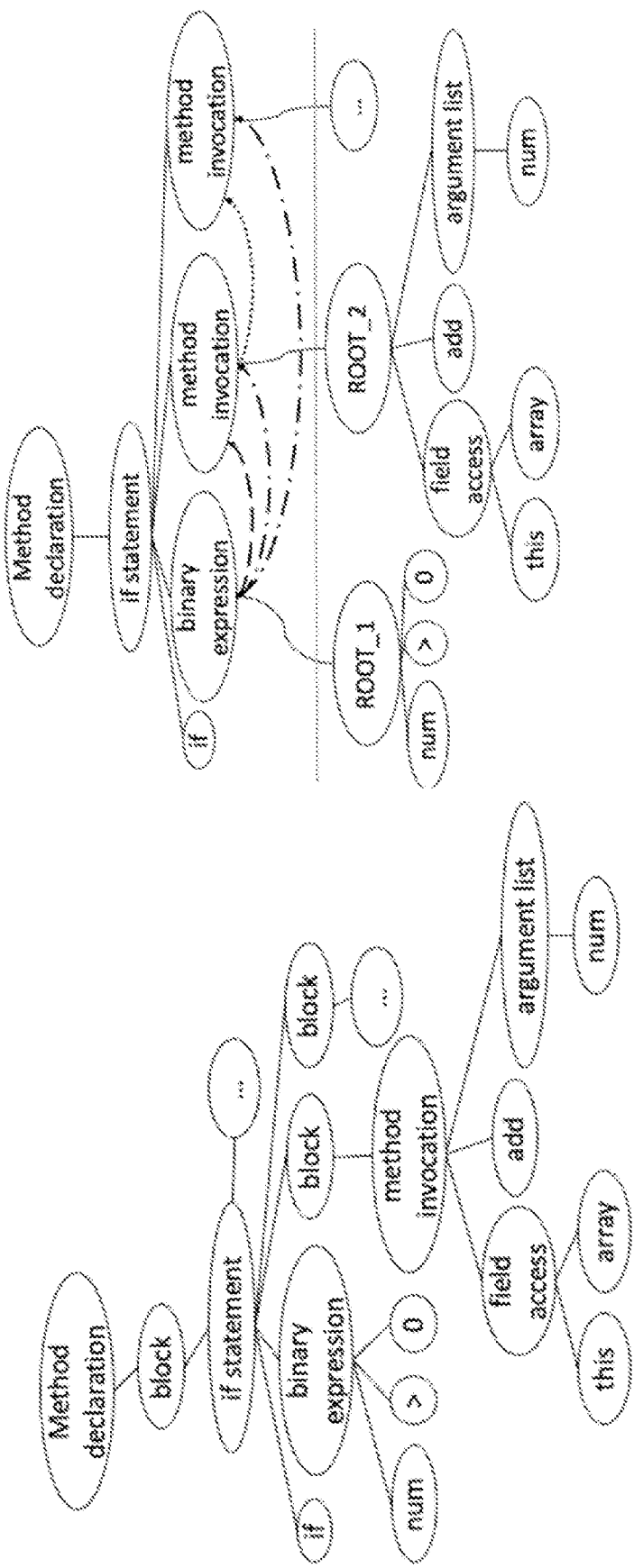
FIG. 5A illustrates an example AST of the source code in FIG. 4.
FIG. 5B illustrates an example HCR of the source code in FIG. 4.

The HCR generator 110 extracts the plurality of subtrees 106 from an AST of the source code 102 by using carefully designed rules to form the second level and build the AST-level of HCRs. Some examples of these rules are shown in FIG. 3. FIG. 5A shows an example AST of the source code in FIG. 4.

The HCR also includes a graph 104 that includes the plurality of nodes and a plurality of edges between the plurality of nodes. The plurality of edges represents dependencies and relations between the plurality of elements in the source code 102.

Examples of source code and its HCR are shown in FIG. 2, FIG. 4 and FIG. 5B. FIG. 5B illustrates an example HCR of the source code in FIG. 4.

The sub-system 109 is configured to generate, for each node of the plurality of nodes in the AST sequence 108, a respective initial embedding for the node. In particular, the sub-system 109 computes the respective initial representation of each node $l_i$ by concatenating the embeddings of its token and its type. These embeddings can be looked up from two learnable embedding matrices (token and type). Let $s_i$ denote the initial embedding of the node $l_i$, $i \in N$, $0 < i \leq k$, where k is the length of L.

The Transformer encoder neural network 112 is configured to receive the initial embeddings 111 generated for the plurality of nodes, and to generate, for each initial embedding of each node, a respective learned representation 118 that captures lexical information of the node. More specifically, the Transformer encoder neural network encodes the linearized AST sequence L to capture lexical values. It takes initial embeddings $[s_1, s_2, \ldots, s_k]$ as input and produces the output $[h_1, h_2, \ldots, h_k]$.

Lexical information refers to the basic building blocks of source code, such as tokens, keywords, identifiers, and literals. These are the smallest units of code that have meaning to the compiler or interpreter.

For example, in Python, the following code contains lexical elements:

variable_name=42

Here, the lexical elements include variable_name, =, 42, and the whitespace.

The tree-based encoder neural network 114 is configured to receive as input the plurality of subtrees 106 and the learned representations 118 generated by the Transformer encoder neural network 112, and to process the plurality of subtrees 106 and the learned representations 118 to generate, for each subtree, a respective tree embedding.

In some implementations, the tree-based encoder neural network 114 also embeds non-subtree nodes in L by applying a non-linear transformation to the non-subtree nodes. To model local patterns and hierarchical relations among nodes within the same subtree, all subtrees are passed through a Tree-based convolutional neural network. An attention aggregation technique then employed to encode each subtree as an embedding vector, using a global attention vector $\alpha$. In these implementations, the output of the tree-based encoder neural network 114 are denoted as $\hat{t}_{i_{t=1}}^m$ where m is the number of subtree nodes and non-subtree nodes.

Examples of a Tree-based convolutional neural network are described in Lili Mou, Ge Li, Lu Zhang, Tao Wang, and Zhi Jin. 2016a. Convolutional neural networks over tree structures for programming language processing. In *AAAI Conference on Artificial Intelligence*. Examples of an attention aggregation technique is described in Uri Alon, Meital Zilberstein, Omer Levy, and Eran Yahav. 2019c. Code2vec: Learning distributed representations of code. *Proc. ACM Programming Languages*, 3 (POPL):40:1-40:29.

The HGT neural network 116 is configured to receive as input the graph 104 and the tree embeddings 120, and to process the graph 104 and the tree embeddings 120 to generate a plurality of node vectors 122 that represent dependencies between the plurality of nodes in the graph 104. The node vectors 122 are denoted as $n_{i_{t=1}}^m$. The node vectors 122 does not only bring textual information (by the Transformer encoder and next-subtree edges) but also are contextualized by the locally hierarchical structures of the subtrees and dependence information that are unique characteristics in the source code 102.

The graph aggregator 128 is configured to aggregate the plurality of node vectors 122 to generate a graph embedding 130 that encapsulates semantic information of the source code 102. Semantics information focuses on the meaning of the code. It goes beyond the syntax to determine whether the code is logically correct and behaves as intended. It involves understanding the relationships between different code elements. For example, consider the following Python code:

result="2"+"2"

While the syntax is valid, the semantics dictate that this code concatenates two strings, resulting in "22", not the integer 4.

The graph aggregator 128 is configured to utilize an attention aggregation technique to aggregate the nodes and generate a graph embedding, represented as g. This graph embedding encapsulates the overall semantic meaning of the code.

$$g = \sum_{i=1}^{m} \frac{\exp(\beta^T n_i)}{\sum_{j=1}^{m} \exp(\beta^T n_j)} n_i$$

where $\beta$ is the global attention vector, and $n_{i_{t=1}}^m$ are the output of the HGT neural network 116.

The token index selector 124 is configured to receive the learned representations 118 generated by the Transformer encoder neural network 112 and to select a subset of learned representations 134 that are associated with nodes having non-empty tokens while discarding the learned representations associated with nodes that do not have non-empty tokens. The rationale is that transformer encoder neural network 112 effectively encodes textual meaning but is inadequate in encoding syntax (as represented by the type attribute), which could potentially introduce noise to the gating neural network layer 136 and/or the transformer decoder neural network 140 later.

Formally, let H' be the sequence of the elements $h_i$ such that $l_i$ is a token node, for all $0 < i \leq k$. We denote the members of H' by $h'_1, h'_2, \ldots, h'_{k'}$ where k' is the number of token nodes in the L.

As the information flows in a bottom-up fashion, there is still a lack of connections across layers. Thus, the neural network system 100 uses a hierarchy-aware cross attention neural network layer 126 to enable tokens to attend to nodes in the structure (subtrees and graph).

Generally, the hierarchy-aware cross attention neural network layer 126 is configured to receive as input the learned representations 118, the tree embeddings generated by the tree-based encoder neural network 114, the plurality of node vectors 122, and the graph embedding 130, and to process the learned representations 118, the tree embeddings generated by the tree-based encoder neural network 114, the plurality of node vectors 122, and the graph embedding 130 to generate a fused hierarchical context output 132. The fused hierarchical context output 132 includes a plurality of fused hierarchical context embedding vectors with each vector corresponding to a token. The described system represents source code as a heterogeneous code hierarchy and includes multiple neural network layers. Information from lower layers is utilized for aggregation, serving as input to higher layers. In addition, components within each layer interact with each other to gain awareness of the context within that layer. As a result, the fused hierarchical context output 132 is the synthesis of information spanning across layers and interactions among components within each layer.

More specifically, the hierarchy-aware cross attention neural network layer 126 is a cross-attention between tokens and nodes in subtrees and graph. The Key and Value vectors are from the combination of the nodes' embeddings $\{n_i\}_{i=1}^{m}$ and the graph embeddings g. The Query vectors are derived from the concatenation of the token embedding $h_i$ and the respective tree embedding $\hat{t}_i$; formally, $q_i=f_{ca}([h_i', \hat{t}_i])$ where $f_{ca}$ is a projection from 2d-dimensional space to 1d-dimensional space. This layers returns $\{c_i\}_{i=1}^{k_1}$ where $c_i$ is the fused hierarchical context for the token node $l_i$ corresponding to $h_i'$, for all $0<i\leq k$.

The gating neural network layer 136 is configured to receive as input the subset of learned representations 134 and the fused hierarchical context output 132, and to process the token index selection output 134 and the fused hierarchical context output 132 to generate hierarchy-aware hidden states 138.

In particular, the gating neural network layer 136 is configured combine the output of the token index selector 124, denoted as $\{h_i'\}_{i=1}^{k_1}$, and the output of hierarchy-aware cross attention neural network layer 126, denoted as $\{c_i'\}_{i=1}^{k_1}$. To add a sufficient amount of context from $c_i$ to $h_i'$, the ratio between two sources is controlled by the graph embedding g: $\lambda=\text{sigmoid}(Wg+b)$. The output of this layer are the hierarchy-aware hidden states, denoted as $\{e_i\}_{i=1}^{k_1}$, and computed as:

$$e_i=\lambda f_c(c_i)+(1-\lambda)h_i'.$$

The Transformer decoder neural network 140 is configured to receive as decoder input the hierarchy-aware hidden states 138, denoted as $\{e_i\}_{i=1}^{k_1}$, the graph embedding 130, and the plurality of node vectors 122. The Transformer decoder neural network 140 is configured to process the decoder input to generate a system output 142.

The system output 142 includes, for each position of a plurality of positions in a target text sequence, a probability distribution over target vocabulary for the position. The Transformer decoder neural network 140 is configured to compute the probability distribution over the target vocabulary for each position based on (i) one or more probability distributions computed for one or more previous positions and (ii) the decoder input. The target text sequence is a summary of the source code 102.

The target vocabulary includes a set of candidate tokens. In some implementations, a candidate token is a sub-word or a word. In some implementations, a candidate token is a number. All tokens that will appear in the generated summary are included in the target vocabulary. Each token is a piece of text that serves as a useful semantic unit for processing. Each token varies in length. The probability distribution over the target vocabulary for each position assigns a respective score to each candidate token in the set of candidate tokens. The respective score represents a likelihood the candidate token is the correct token that should be placed at the position in the target text sequence.

In some implementations, to generate a summary for the source code 102, for each position in the target text sequence, the neural network system 100 may sample from the probability distribution calculated for that position to select a token as the next token in line with a decoding strategy (for example, a greedy decoding). A token is from the above-described target vocabulary. In some implementations, a token is a sub-word or a word. Tokens can be as short as one character or as long as an entire word or even a group of words.

The neural network system 100 may use a decoding strategy such as greedy search, beam search, nucleus sampling, or another appropriate decoding algorithm.

Explanation of a Decoding Process that Involves an Encoder and a Decoder:

Upon receiving an input sequence that includes a piece of code, the encoder yields hidden states, each corresponding to a token within the input sequence. Subsequently, the decoder initiates a generation process with the first token, which can be denoted as <sos> (start of string). The decoding process iterates to produce sequences until a special token, <eos> (end of string), is emitted, indicating the conclusion of the sequence. Each decoding strategy is discerned by how it selects the next token given the current generated summary and the encoder's hidden states.

To illustrate the decoding process, if the methodology employed is the greedy search algorithm, then at each step of token generation, the following procedures are executed:
 1. Given the current generated sequence and the encoder's hidden states, the decoder returns a probability distribution over the target vocabulary.
 2. Adhering to the principles of greedy search, the token that has the highest probability from the distribution in Step 1 is chosen as the next token.
 3. The next token chosen in Step 2 is appended to the generated sequence, thus extending the sequence. This process is reiterated until the <eos> token is emitted, signaling the completion of the sequence.

In some other implementations, the neural network system 100 may send the system output 142 to another system that is configured to generate a summary of the source code from the system output 142.

Figure 6:
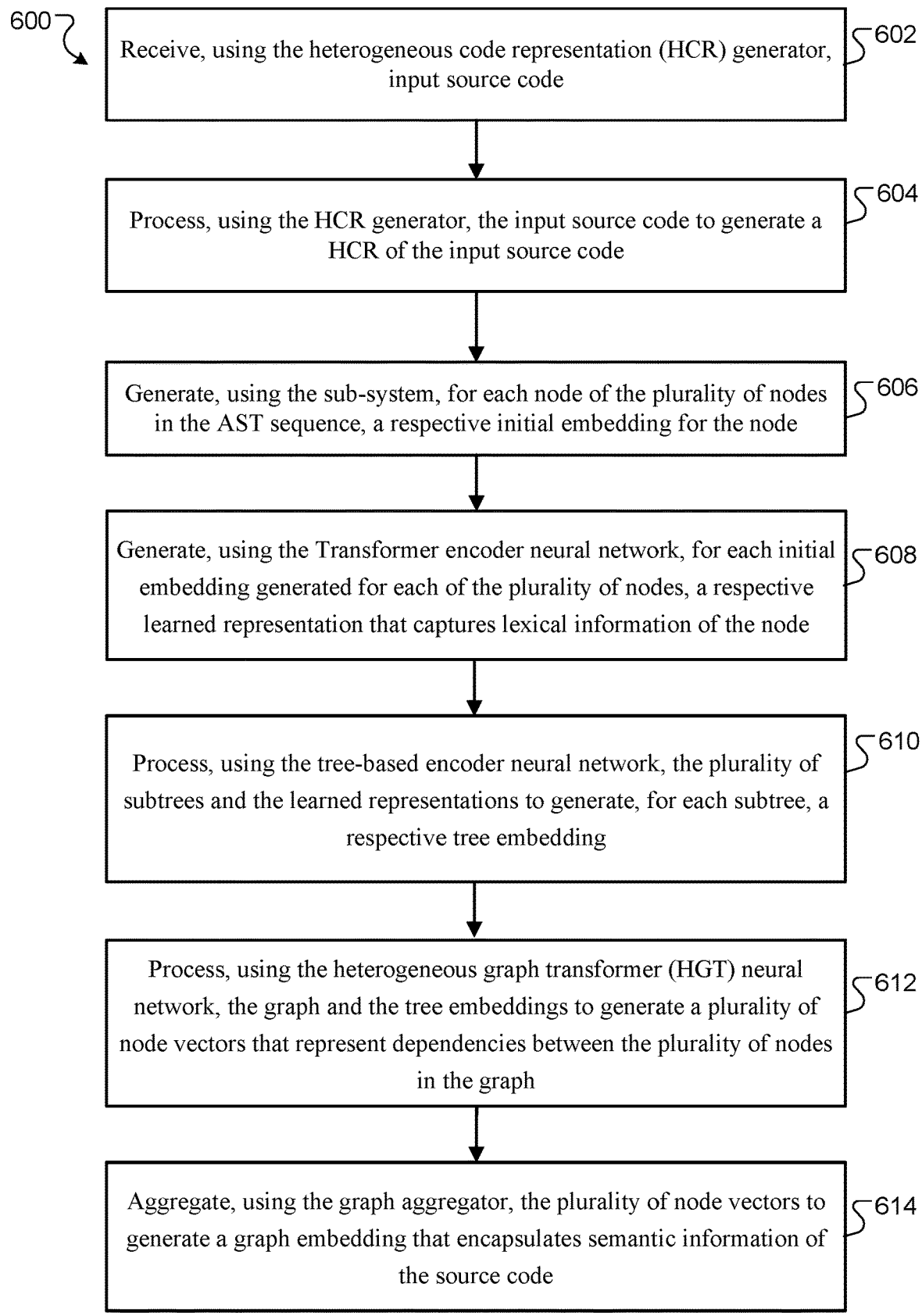
FIG. 6 is a flow diagram of an example process for generating a summary of source code.

FIG. 6 is a flow diagram of an example process for summarizing source code using a neural network system that comprises a heterogeneous code representation (HCR) generator, a sub-system, a Transformer encoder neural network, a tree-based encoder neural network, a heterogeneous graph transformer (HGT) neural network, and a graph aggregator.

For convenience, the process 600 will be described as being performed by a system of one or more computers located in one or more locations. For example, a neural network system, e.g., the neural network system 100 of FIG. 1, appropriately programmed in accordance with this specification, can perform the process 600.

The system receives, using the heterogeneous code representation (HCR) generator, source code as input (step 602).

The system processes, using the HCR generator, the source code to generate a HCR of the source code (step 604). The HCR includes (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code.

The system generates, using the sub-system, for each node of the plurality of nodes in the AST sequence, a respective initial embedding for the node (step 606).

The system generates, using the Transformer encoder neural network, for each initial embedding generated for each of the plurality of nodes, a respective learned representation that captures lexical information of the node (step 608).

The system processes, using the tree-based encoder neural network, the plurality of subtrees and the learned representations to generate, for each subtree, a respective tree embedding (step 610).

The system processes, using the heterogeneous graph transformer (HGT) neural network, the graph and the tree embeddings to generate a plurality of node vectors that represent dependencies between the plurality of nodes in the graph (step 612).

The system aggregates, using the graph aggregator, the plurality of node vectors to generate a graph embedding that encapsulates semantic information of the source code (step 614).

In some implementations, the neural network system includes a token index selector. The system selects, using the token index selector, from the learned representations, a subset of learned representations that are associated with nodes having non-empty tokens.

In some implementations, the neural network system includes a hierarchy-aware cross attention neural network layer. The system processes, using the hierarchy-aware cross attention neural network layer, the learned representations, the tree embeddings, the plurality of node vectors, and the graph embedding to generate a fused hierarchical context output.

In some implementations, the neural network system includes a gating neural network layer. The system processes, using the gating neural network layer, the token index selection output and the fused hierarchical context output to generate hierarchy-aware hidden states.

In some implementations, the neural network system includes a Transformer decoder neural network. The system processes, using the Transformer decoder neural network, a decoder input comprising the hierarchy-aware hidden states, the graph embedding, and the plurality of node vectors to generate a system output.

In some implementations, the system output includes, for each position of a plurality of positions in a target text sequence, a probability distribution over target vocabulary for the position. The target text sequence is a summary of the source code.

In those implementations, the system computes, using the Transformer decoder neural network, the probability distribution over the target vocabulary for each position based on (i) one or more probability distributions computed for one or more previous positions and (ii) the decoder input. The target vocabulary includes a set of candidate tokens. The probability distribution over the target vocabulary for each position assigns a respective score to each candidate token in the set of candidate tokens, in which the respective score represents a likelihood the candidate token is the correct token that should be placed at the position in the target text sequence.

To generate a summary for the source code, for each position in the target text sequence, the system may sample from the probability distribution calculated for that position to select a token as the next token in line with a decoding strategy (for example, a greedy decoding).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A neural network system for summarizing source code, the neural network system comprising one or more computers and one or more non-transitory computer storage media storing instructions that, when executed by the one or more computers, cause the one or more computers to implement:
a heterogeneous code representation (HCR) generator configured to receive source code and to process the source code to generate a HCR of the source code, wherein the HCR comprises (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code;
a sub-system configured to generate, for each node of the plurality of nodes in the AST sequence, a respective initial embedding for the node, wherein generating the respective initial embedding for the node comprises concatenating embeddings of the token and the type of the node;
a Transformer encoder neural network configured to receive the initial embedding generated by concatenating the embeddings of the token and the type of each node in the plurality of nodes, and to generate, for each initial embedding of each node, a respective learned representation that captures lexical information of the node;
a tree-based encoder neural network configured to:
receive as input the plurality of subtrees that represent the syntax information of the source code and the learned representations generated by the Transformer encoder neural network for the plurality of nodes and representing the lexical information of the plurality of nodes, and
process both of the plurality of subtrees that present the syntax information of the source code and the learned representations that represent the lexical information of the plurality of nodes to generate, for each subtree, a respective tree embedding;
a heterogeneous graph transformer (HGT) neural network configured to:
receive as input both of (i) the graph and (ii) the tree embeddings generated by the tree-based encoder neural network by processing both of the plurality of subtrees and the learned representations, and
process both of the graph and the tree embeddings to generate a plurality of node vectors that represent dependencies between the plurality of nodes in the graph; and
a graph aggregator configured to aggregate the plurality of node vectors to generate a graph embedding that encapsulates semantic information of the source code.

2. The neural network system of claim 1, further comprising:
a token index selector configured to receive the learned representations generated by the Transformer encoder neural network and to select a subset of learned representations that are associated with nodes having non-empty tokens.

3. The neural network system of claim 2, further comprising:
a hierarchy-aware cross attention neural network layer configured to:
receive as input the learned representations, the tree embeddings generated by the tree-based encoder neural network, the plurality of node vectors, and the graph embedding, and
process the learned representations, the tree embeddings, the plurality of node vectors, and the graph embedding to generate a fused hierarchical context output.

4. The neural network system of claim 3, further comprising:
a gating neural network layer configured to receive as input the subset of learned representations and the fused hierarchical context output, and to process the token index selection output and the fused hierarchical context output to generate hierarchy-aware hidden states.

5. The neural network system of claim 4, further comprising:
a Transformer decoder neural network configured to:
receive as decoder input the hierarchy-aware hidden states, the graph embedding, and the plurality of node vectors, and
process the decoder input to generate a system output.

6. The neural network system of claim 5, wherein the system output comprises, for each position of a plurality of positions in a target text sequence, a probability distribution over target vocabulary for the position,
wherein the Transformer decoder neural network is configured to compute the probability distribution over the target vocabulary for each position based on (i) one or more probability distributions computed for one or more previous positions and (ii) the decoder input, and
wherein the target text sequence is a summary of the source code.

7. The neural network system of claim 6, wherein the target vocabulary comprises a set of candidate tokens,
wherein the probability distribution over the target vocabulary for each position assigns a respective score to each candidate token in the set of candidate tokens, and
wherein the respective score represents a likelihood the candidate token is the correct token that should be placed at the position in the target text sequence.

8. A computer-implemented method for summarizing source code using a neural network system that comprises a heterogeneous code representation (HCR) generator, a sub-system, a Transformer encoder neural network, a tree-based encoder neural network, a heterogeneous graph transformer (HGT) neural network, and a graph aggregator, the method comprising:

receiving, using the HCR generator, source code;

processing, using the HCR generator, the source code to generate a HCR of the source code, wherein the HCR comprises (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code;

generating, using the sub-system, for each node of the plurality of nodes in the AST sequence, a respective initial embedding for the node, wherein generating the respective initial embedding for the node comprises concatenating embeddings of the token and the type of the node;

generating, using the Transformer encoder neural network, for each initial embedding generated for each of the plurality of nodes, a respective learned representation that captures lexical information of the node;

processing, using the tree-based encoder neural network, both of (i) the plurality of subtrees that represent the syntax information of the source code and (ii) the learned representations generated using the Transformer encoder neural network for the plurality of nodes and representing the lexical information of the plurality of nodes to generate, for each subtree, a respective tree embedding;

processing, using the heterogeneous graph transformer (HGT) neural network, both of the graph and the tree embeddings generated by processing both of the plurality of subtrees and the learned representations to generate a plurality of node vectors that represent dependencies between the plurality of nodes in the graph; and aggregating, using the graph aggregator, the plurality of node vectors to generate a graph embedding that encapsulates semantic information of the source code.

9. The computer-implemented method of claim 8, wherein the neural network system further comprises a token index selector, and wherein the method further comprises:

selecting, using the token index selector, from the learned representations, a subset of learned representations that are associated with nodes having non-empty tokens.

10. The computer-implemented method of claim 9, wherein the neural network system further comprises a hierarchy-aware cross attention neural network layer, and wherein the method further comprises:

processing, using the hierarchy-aware cross attention neural network layer, the learned representations, the tree embeddings, the plurality of node vectors, and the graph embedding to generate a fused hierarchical context output.

11. The computer-implemented method of claim 10, wherein the neural network system further comprises a gating neural network layer, and wherein the method further comprises:

processing, using the gating neural network layer, the token index selection output and the fused hierarchical context output to generate hierarchy-aware hidden states.

12. The computer-implemented method of claim 11, wherein the neural network system further comprises a Transformer decoder neural network, and wherein the method further comprises:

process, using the Transformer decoder neural network, a decoder input comprising the hierarchy-aware hidden states, the graph embedding, and the plurality of node vectors to generate a system output.

13. The computer-implemented method of claim 12, wherein the system output comprises, for each position of a plurality of positions in a target text sequence, a probability distribution over target vocabulary for the position, and wherein the method comprises computing, using the Transformer decoder neural network, the probability distribution over the target vocabulary for each position based on (i) one or more probability distributions computed for one or more previous positions and (ii) the decoder input, and wherein the target text sequence is a summary of the source code.

14. The computer-implemented method of claim 13, wherein the target vocabulary comprises a set of candidate tokens, wherein the probability distribution over the target vocabulary for each position assigns a respective score to each candidate token in the set of candidate tokens, and wherein the respective score represents a likelihood the candidate token is the correct token that should be placed at the position in the target text sequence.

15. One or more non-transitory computer storage media storing instructions that, when executed by one or more computers, cause the one or more computers to perform operations for summarizing source code using a neural network system, wherein the neural network system comprises a heterogeneous code representation (HCR) generator, a sub-system, a Transformer encoder neural network, a tree-based encoder neural network, a heterogeneous graph transformer (HGT) neural network, and a graph aggregator, and wherein the operations comprise:

receiving, using the heterogeneous code representation (HCR) generator, source code;

processing, using the heterogeneous code representation (HCR) generator, the source code to generate a HCR of the source code, wherein the HCR comprises (i) an abstract syntax tree (AST) sequence that comprises a plurality of nodes linearly arranged into a sequence, each node representing one of a plurality of elements in the source code and each node comprising a token and a type, (ii) a plurality of subtrees that represent syntax information of the source code, and (iii) a graph that comprises the plurality of nodes and a plurality of edges between the plurality of nodes, the plurality of edges representing dependencies and relations between the plurality of elements in the source code;

generating, using the sub-system, for each node of the plurality of nodes in the AST sequence, a respective initial embedding for the node, wherein generating the respective initial embedding for the node comprises concatenating embeddings of the token and the type of the node;

generating, using the Transformer encoder neural network, for each initial embedding generated for each of the plurality of nodes, a respective learned representation that captures lexical information of the node;

processing, using the tree-based encoder neural network, both of (i) the plurality of subtrees that represent the syntax information of the source code and (ii) the learned representations generated using the Transformer encoder neural network for the plurality of nodes and representing the lexical information of the plurality of nodes to generate, for each subtree, a respective tree embedding;

processing, using the heterogeneous graph transformer (HGT) neural network, both of the graph and the tree embeddings generated by processing both of the plurality of subtrees and the learned representations to generate a plurality of node vectors that represent dependencies between the plurality of nodes in the graph; and aggregating, using the graph aggregator, the plurality of node vectors to generate a graph embedding that encapsulates semantic information of the source code.

16. The one or more non-transitory computer storage media of claim 15, wherein the neural network system further comprises a token index selector, and wherein the operations further comprise:

selecting, using the token index selector, from the learned representations, a subset of learned representations that are associated with nodes having non-empty tokens.

17. The one or more non-transitory computer storage media of claim 16, wherein the neural network system further comprises a hierarchy-aware cross attention neural network layer, and wherein the operations further comprise:

processing, using the hierarchy-aware cross attention neural network layer, the learned representations, the tree embeddings, the plurality of node vectors, and the graph embedding to generate a fused hierarchical context output.

18. The one or more non-transitory computer storage media of claim 17, wherein the neural network system further comprises a gating neural network layer, and wherein the operations further comprise:

processing, using the gating neural network layer, the token index selection output and the fused hierarchical context output to generate hierarchy-aware hidden states.

19. The one or more non-transitory computer storage media of claim 18, wherein the neural network system further comprises a Transformer decoder neural network, and wherein the operations further comprise:

process, using the Transformer decoder neural network, a decoder input comprising the hierarchy-aware hidden states, the graph embedding, and the plurality of node vectors to generate a system output.

20. The one or more non-transitory computer storage media of claim 19, wherein the system output comprises, for each position of a plurality of positions in a target text sequence, a probability distribution over target vocabulary for the position, and wherein the operations comprise computing, using the Transformer decoder neural network, the probability distribution over the target vocabulary for each position based on (i) one or more probability distributions computed for one or more previous positions and (ii) the decoder input, and wherein the target text sequence is a summary of the source code.

* * * * *